United States Patent [19]

Persson

[11] E Patent Number: Re. 31,775

[45] Reissued Date of Patent: Dec. 25, 1984

[54] METHOD AND AN APPARATUS FOR DISTRIBUTING A DISINTEGRATED MATERIAL ONTO A LAYER FORMING SURFACE

[75] Inventor: Torsten B. Persson, Maarslet, Denmark

[73] Assignee: Scan-Web I/S, Risskov, Denmark

[21] Appl. No.: 273,040

[22] Filed: Jun. 12, 1981

Related U.S. Patent Documents

Reissue of:

[64] Patent No.: 4,157,724
Issued: Jun. 12, 1979
Appl. No.: 862,035
Filed: Dec. 19, 1977

U.S. Applications:

[63] Continuation of Ser. No. 717,384, Aug. 24, 1976, abandoned.

[30] Foreign Application Priority Data

Aug. 27, 1975 [GB] United Kingdom ..... 35429/75

[51] Int. Cl.[3] ..... B65B 1/14

[52] U.S. Cl. ..... 141/1; 141/11; 141/131; 19/304; 264/122; 425/83.1

[58] Field of Search ..... 141/1, 67, 129, 131; 427/183, 294, 348; 425/80.1, 81.1, 82.1, 83.1; 19/304-308; 264/87, 121-123, DIG. 75; 162/292; 65/9

[56] References Cited

U.S. PATENT DOCUMENTS

| | | | |
|---|---|---|---|
| 2,738,557 | 3/1956 | Anderson et al. | 425/83.1 |
| 2,751,633 | 6/1956 | Clark | 425/83.1 |
| 2,912,723 | 11/1959 | Roberts | 19/304 X |
| 2,931,076 | 4/1960 | Clark | 425/83.1 |
| 2,940,135 | 6/1960 | Heritage | 19/304 X |
| 3,145,430 | 8/1964 | Caron | 425/83.1 |
| 3,680,175 | 8/1972 | Kamp et al. | 425/83.1 |
| 3,886,629 | 6/1975 | Nakai et al. | 425/83.1 |
| 4,014,635 | 3/1977 | Kroyer | 425/83.1 |
| 4,030,865 | 6/1977 | Kobayashi | 425/83.1 |
| 4,060,360 | 11/1977 | Tapp | 19/304 |

FOREIGN PATENT DOCUMENTS

| | | | |
|---|---|---|---|
| 1207556 | 10/1970 | United Kingdom | 19/304 |

*Primary Examiner*—Houston S. Bell, Jr.
*Attorney, Agent, or Firm*—Antonelli, Terry & Wands

[57] ABSTRACT

A method and an apparatus for distributing loose fibers or particles onto a moving web in an even layer thereon preparatory to production of a non-woven sheet of the fiber or particle material. The material is filled into a container having a generally V-shaped screen bottom extending crosswise over the moving web, and whipping members are rotated in the bottom space so as to whip the material adjacent the interior surface of the screen by a whipping movement causing the fibers or particles to be slung against the screen and the material to move in a flow lengthwise along the bottom surfaces, whereby when suction is applied to the outside of the screen bottom through the web the fibers or particles will get dispensed through the screen and deposited on the web. The combined shipping and slinging of the material contributes to a high capacity of the distribution.

41 Claims, 7 Drawing Figures

Figure 1:
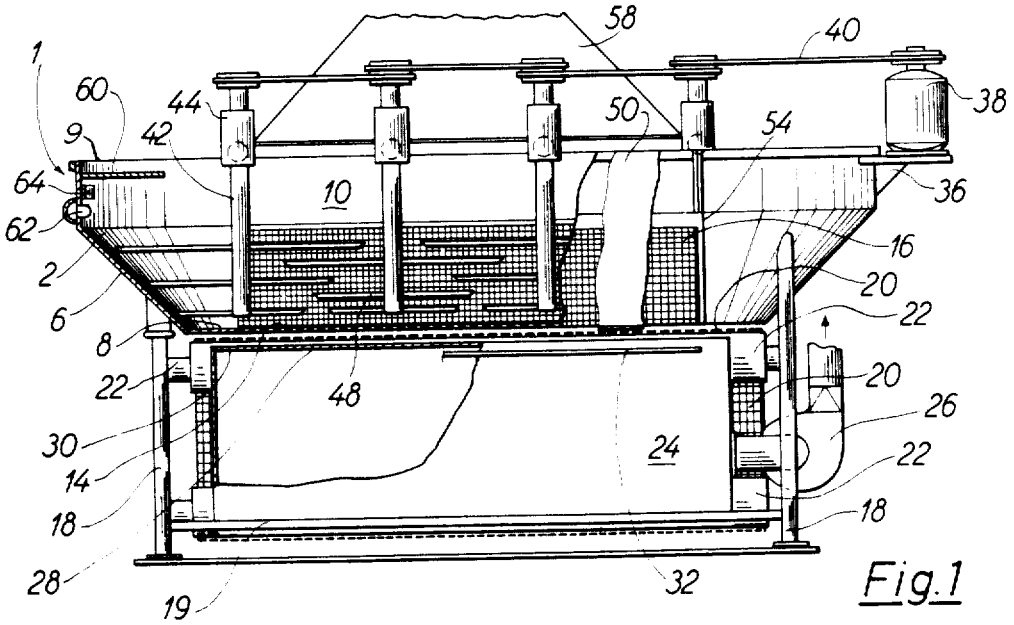

METHOD AND AN APPARATUS FOR DISTRIBUTING A DISINTEGRATED MATERIAL ONTO A LAYER FORMING SURFACE

Matter enclosed in heavy brackets [ ] appears in the original patent but forms no part of this reissue specification; matter printed in italics indicates the additions made by reissue.

This is a continuation of application Ser. No. 717,384, filed Aug. 24, 1976, now abandoned.

The present invention relates to a method of distributing loose fibres or particles onto a carrier surface constituted by a carrier web, by filling the fibre or particle material into a container having a screen wall portion located adjacent one side of said carrier web, agitating the material violently and creating an air flow through the material and through the said screen and web by sucking air from the other side of the web so as to cause the fibres or particles to gradually penetrate the screen and get deposited in a layer on the moving carrier web.

A method of this type and an apparatus for carrying out the method is disclosed in the British patent specification No. 1,207,556 (*corresponding to U.S. Patent No. 3,581,706*). The fibre material is filled into a circular cylindric vat having a plane, perforated bottom constituting the said screen wall portion and located parallel and close to the underlying, moving carrier web. For the agitation of the material near the screen bottom is used a stirring device comprising two vertical rotor shafts mounted in a planet gear arrangement overhead the vat and at their lower ends, just above the screen bottom, provided with radial, vertically oriented impeller fins or blades whirling around in the bottom material layer. Underneath the vat and the moving web is arranged a suction box which draws an air flow through the material in the vat and through the screen bottom and the web, whereby the disintegrated fibres near the bottom are drawn out and deposited on the moving web in a reasonably even layer thereon. The web moves the layer to a binding and curing station in which the layer is made into a non-woven sheet material for one of a wide variety of purposes.

By the agitation of the fibre material it is aimed to ensure that the fibres are kept mixed with the air and are caused to be repeatedly rearranged with respect to the adjoining fibres, whereby they will sooner or later get the opportunity to pass through the fine holes in the screen together with the suction air. The degree of rearrangement of the fibres is highest where the blade edge velocity is highest, i.e. an effective agitation is obtained in an annular area adjacent the outer blade edge portions. However, due to the centrifugal forces which tend to blow the material away from this area, it can be observed that for increasing impeller speed the dispensing capacity of the apparatus increases only to a certain point, whereafter it decreases, and in fact the obtainable maximum capacity is not as high as could be desirable.

According to another known method the fibre material is fed to the cylindric space between a lying rotating drum and a screen shell, the drum carrying a high number of radially protruding needles which serve to disintegrate and rearrange the fibre material. However, the material tends to be moved rapidly through the said space along with the drum surface, and hereby the velocity of the needles relative to the material is not by far as high as the absolute needle velocity, and the ability of the needles to cause rearrangement of the fibres, therefore, and therewith the dispensing capacity is correspondingly relatively low.

It is the purpose of this invention to provide a method whereby a high dispensing capacity is achieved in a simple manner.

According to the invention the material in the container is agitated by whipping it immediately inside the said screen wall portion. The term "whipping" as used here and in the following and in the appended claims is intended to be indicative of the act of repeatingly moving through the material to be whipped a relatively narrow beat member having proportions so as to cause disturbance in the configuration of submatters of the material along the moving path of the beat or whip member through the material, without to any substantial degree causing the material to move in the beating direction, such that the submatters along the moving path of the beat member are vividly separated and displaced. When a dry fibrous or otherwise loose material is whipped in this manner in air the fibres or particles are kept in air fluidized condition, and the whipping involves a high degree of rearrangement of the fibres or particles without forcing these to move along with the whip or beat members, and consequently the fibres or particles are readily sucked out through the holes in the screen wall portion, whereby a high dispensing capacity in ensured. An increased whipping speed primarily involves an increased rate of rearrangement of the fibres or particles and therewith an increased dispensing capacity within wide limits.

In partice it may be troublesome to effect whipping of the material adjacent all surface portions of the screen wall of the container, but tests have shown that excellent results are obtainable if the whipping is effected in spaced areas along the screen wall and the material is caused to be moved, relatively slowly, from one whipping area to the next. Once whipped the material remains in its air fluidized condition for some time, and if the whipping is repeated soon thereafter by virtue of the material being moved to the next whipping station along the screen the fibres or particles even in the material flow between the whipping stations will be readily dispensable through the screen holes.

The said movement of the material from one whipping station to the next and so forth is easily obtainable by means of the whipping members themselves, when they are moved in a unidirectional manner adjacent the screen so as to cause a general, relatively slow material movement therealong. This movement may well be rapid, in an absolute sense, but far less rapid than the velocity of the whipping members.

The invention further comprises an apparatus for carrying out the described method, as defined in the appended claims and as described in more detail below.

It should be mentioned already here that a very important aspect of the invention is the provision of rotary whip members which rotate in a plane non-parallel to the screen wall portion, whereby the whip members cause the material to be slung against the screen and therewith promote the penetration of the fibres or particles through the screen wall. The agitators may be mounted in a stationary manner, and the fast moving peripheral whip member portions may pass closely along a screen area without the remaining member portions, moving with smaller speed, being moved closely along the screen, whereby they might cause the fibre material to flocculate by rolling it rather than whipping it.

Figure 2:
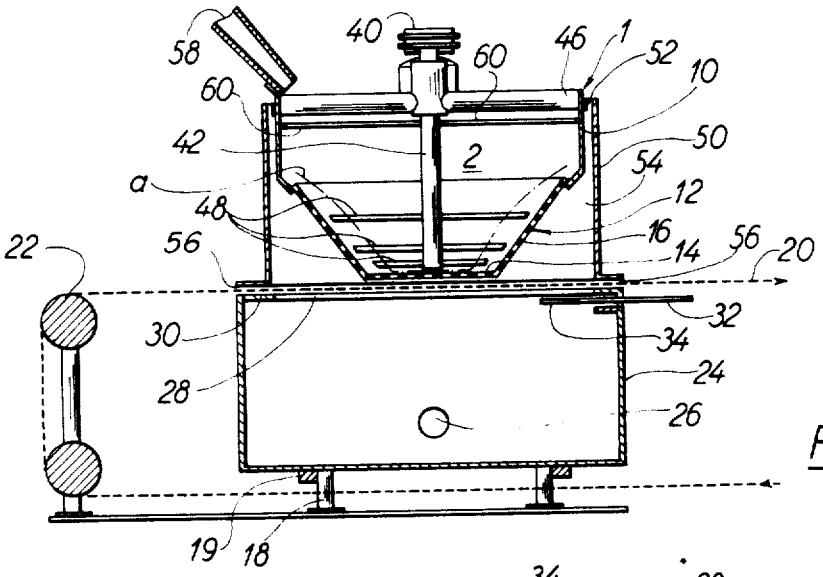
Figure 3:
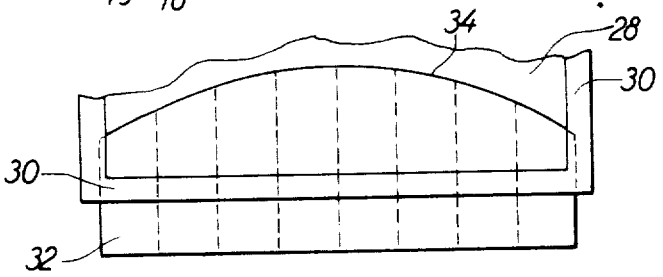
Figure 4:
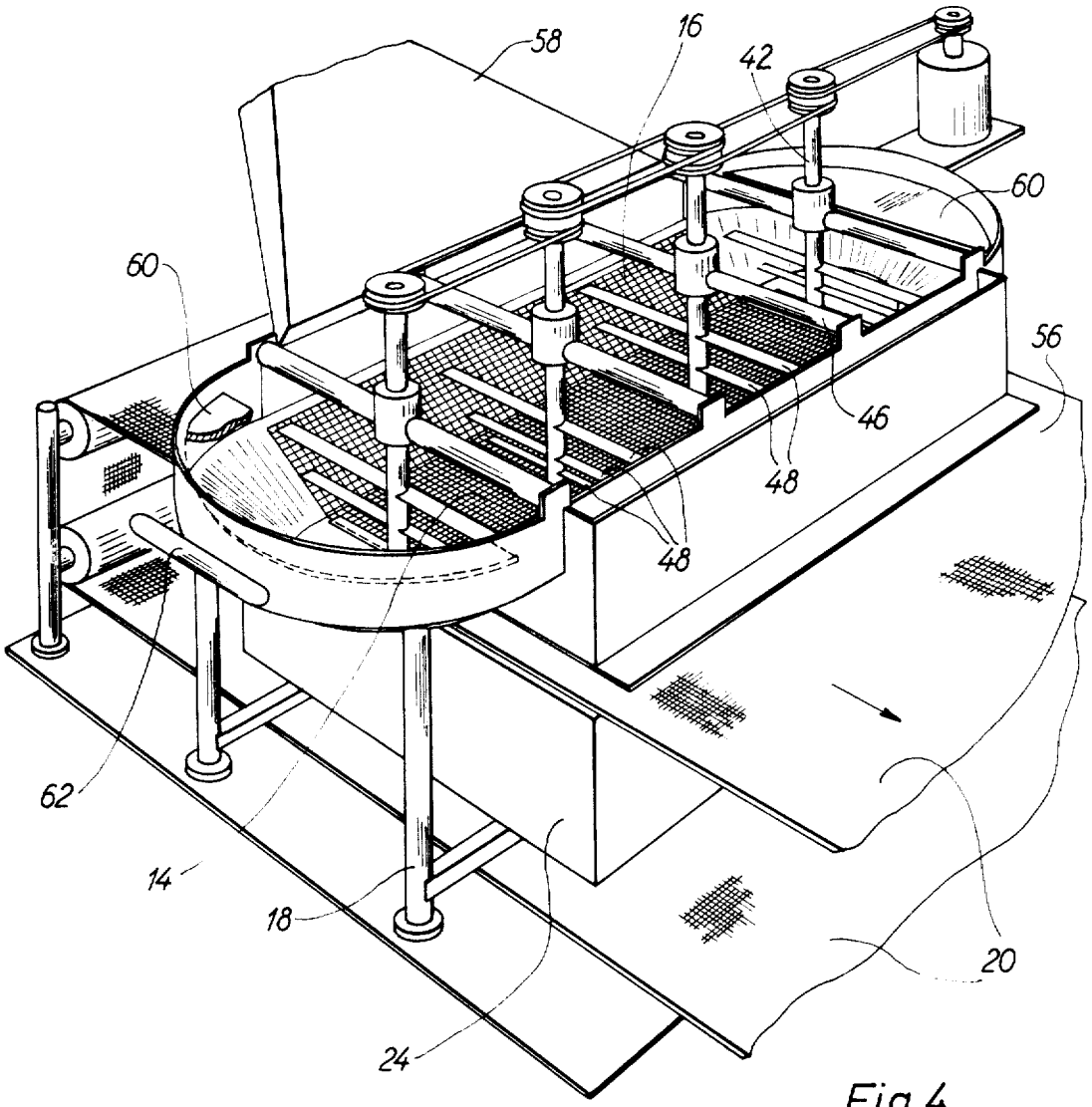
Figure 5:
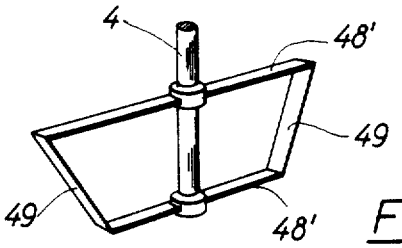
Figure 6:
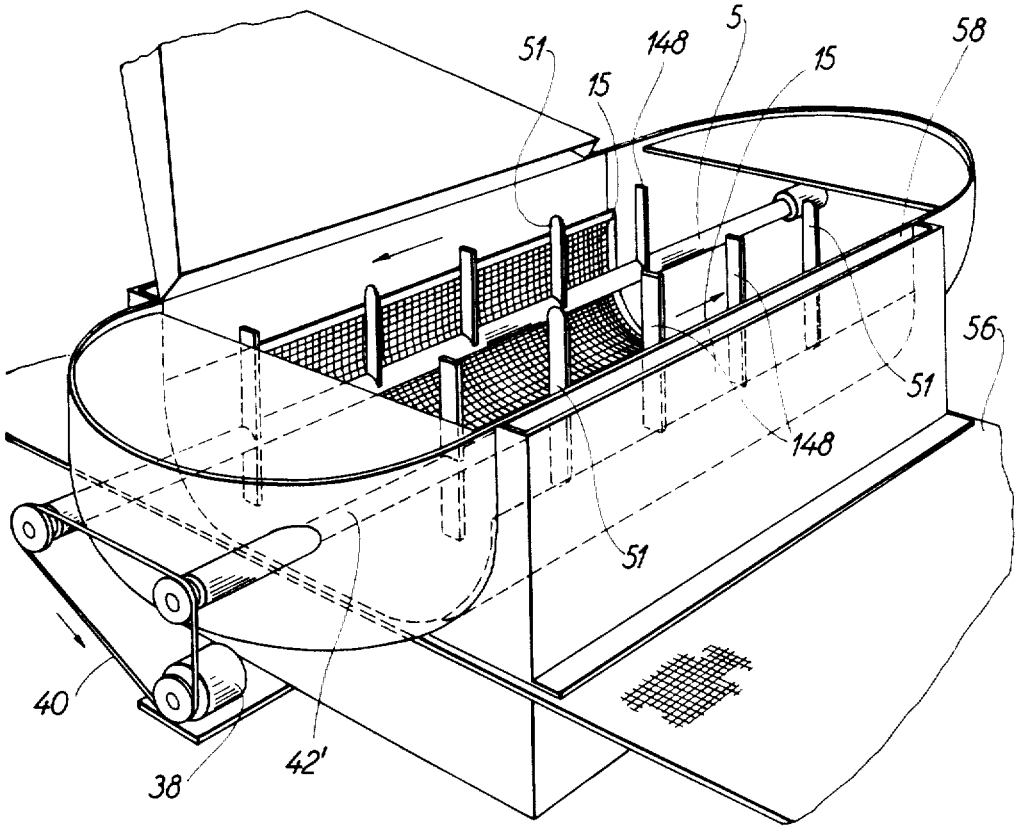
Figure 7:
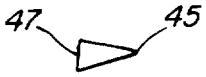

By way of example the invention will now be described in more detail with reference to the accompanying drawing, in which:

FIG. 1 is a side elevation, partly in section, of an apparatus according to a preferred embodiment of the invention, FIG. 2 is a cross sectional side view of this apparatus, FIG. 3 is a detail of FIGS. 1 and 2 as seen from above, FIG. 4 is a sectional perspective view of FIG. 1, FIG. 5 is a view of a modified detail, FIG. 6 is a general view of a modified apparatus according to the invention, and FIG. 7 is a transverse cross-sectional view of one form of agitating member according to the invention.

FIG. 1 shows an elongated fibre distributor container generally designated 1 and shaped with half-rounded end portions 2, each of which having a vertical, cylindric upper portion 9 and a downwardly projecting bottom portion 6 of conical shape and a horizontal, half-circular bottom plate 8. The end portions 2 are interconnected by means of vertical side plates 10 between the upper portions 9, and these parts 2–10 are made of non-perforated metal sheet material. Between the side plates 10 and the end portions 6 and 8 there is mounted a screen as a whole designated 12 and penetratable by fibres and air and being of U-shaped cross section corresponding to the end portions 2, i.e. showing a plane horizontal bottom screen portion 14 and two slanting screen portions 16. The container 1 is supported by means of columns 18 crosswise above a horizontal fibre layer forming web consisting of a finely meshed screen or wire netting 20 which is endlessly drawn about rollers 22 and driven by means of a drive station (not shown) in the direction shown by an arrow. A suction box 24 having an exhauster 26 is arranged beneath the screen 12 and the wire netting 20 and supported by means of beams 19 connected onto the columns 18. The suction box is closed in the bottom portion and the sides and has an upper opening 28 located close to the underside of the web 20, sealed thereagainst by means of sealing flanges 30. The suction box is in one side provided with a horizontal slide gate 32 having a curved edge portion 34 for controlling the suction area, as described in more detail below. At one end portion 4 there is provided a bracket 36 supporting a motor 38, which by means of a chain drive 40 drives four vertical axles 42 running in bearings 44 which are mounted onto cross bares 46 which again are supported at the side plates 10. The axles 42 are arranged in a row in the vertical plane of symmetry of the container and each provided with three pairs of diametrically opposed and radially mounted flat, elongated rotor members 48, the lengths of which are adapted in such a way that their tip portions during rotation will sweep areas of the slanting screens 16 in short distance, and further the lowermost rotor members are arranged just above the bottom screen 14. The lowermost rotor members are situated so as to rotate in a common horizontal plane above the bottom screen 14, while the other rotor members are offset and arranged so as to rotate in areas partly overlapping each other.

Along its broad sides the container is provided with exterior wall plates 50 which together with the side plates 10 form a scavenging channel 52 closed at the sides by plate members 54. The wall plates 50 and the plate members 54 reach down closely above the netting 20 and confines a generally triangular space between the slanting bottom screen 16 and the netting 20, which space is shielded from the surrounding air except for the upper opening of the scavenging channel 52. The wall plate 50 has a right angular bending at the lower edge forming an air sluice 56 through which the netting can pass carrying a layer of fibres deposited thereon as described below.

In operation the axles 42 are rotated in the same direction by which the tips of the rotor members are moved at a velocity in the region of 50 meters per second. This speed is suitable for the treating of e.g. cellulosic fibres, but should be adapted according to the desired product and may vary within wide limitations. An airflow is created through the bottom screens 14,16 via the netting 20, the suction box and out through the exhauster 26. In the same manner air is sucked through the scavenging channels 52. A disintegrated material e.g. cellulosic fibre pulp is fed to the container through a fibre spreading inlet 58 up to approximately the level of the uppermost rotor members and agitated by means of the fast rotating members 48, which will thereby whip violently through the material. By the unidirectional rotation of the rotor members the fibre material is generally thrown against the opposed slanting screen walls 16, whereby the material profile will be somewhat as indicated by a dotted line a in FIG. 2. The material supported by the slanting screen walls is forced by the rotor members 48 to move along the respective walls so as to generally move relatively slowly in a flow around in the container along the sides and ends thereof. The fibres hereby passing the areas swept by the rotor members are vividly whipped and rearranged, and they maintain their state of being fluidized until with said flow they reach the next whipping area. Thus, the slanting bottom screens 16 and the outer edge portions of the bottom screen 14 are continuously being swept by an effectively fluidized current of fibres which can thus readily be sucked through the screens 14,16. Having passed these screens the fibres will follow the suction air and be deposited onto the netting 20 which separates the fibres from the air thus forming a sheet of loose fibre material which by the movement of the netting is carried through the sluice 56 for fixation or other desired purposes.

Some of the fibres are liable to adhere to the inner side of the outer wall 50,54, but are prevented from this by means of the scavenging air flowing down along the inner side of these walls after being oriented in the channel 52. Sucking some air this way towards the netting implies the advantage that possible areas of smaller thickness of the fibre layer on the netting has a tendency to be filled so as to show the desired evenness of the sheet of loose fibres, since more air will pass through the thinner areas than through the thicker areas, whereby more fibres will be directed from the upper dispersing zone adjacent the screen 16 towards the thinner areas in a concentration higher than generally found above the sheet. In this manner, should the fibres be dispensed at an increased rate from the screen portions adjacent the areas swept closely by the tips of the rotor members, the resulting uneven distribution of the fibres will thus be counteracted. It will be noted that the longest way of fibre passage from the screen to the netting is from the upper screen portions, i.e. the portions located near the highest speed area of the rotor member tips, i.e. the most active areas of fibre dispensing.

The flow of fibre material inside the container is turned at either end sections 2 and thrown around and upwardly along the half cones of the bottom portion 6 entering the area adjacent the ends of the cylindrical portion 9 from where the material is guided by means of guide plate members 60 down again along the lengthwise side portions and so forth. During the turning of the flow of material heavy particles or possible clusters of fibres or other scrap matters will concentrate in the area above the cone at the periphery, where they may be removed. For this purpose there is provided a tangential outlet pipe 62 the entrance of which is a horizontal slot partly covered by a slidably mounted plate member 64 for adjusting the height of the slot so as to control the outlet of e.g. scrap matters. It is possible to connect the outlet pipe 62 to recycle means in well known manner.

The rotor members 48 may have any of a variety of shapes for carrying out their whipping function, e.g. as shown in FIG. 5, where 42 designates the lower end of the axle 4 shown in the previous figures to which there is mounted two horizontal arm members 48' similar to the rotor members 48, but at the outer ends being interconnected by means of two inclined whip members 49. In this case the axles 4 should be spaced from each other so as to permit unidirectional rotation. Preferably the rotor members 48 should have more or less sharpened front edges 45, while the rear edges 47 can be flat as shown in FIG. 7 or the rear edges can be shaped or provided with flap members so as to enforce an aerodynamic turbulence, facilitating the fluidizing of the fibres.

The apparatus should not necessarily be provided with three screens 14,16 of equal mesh, since by diligent choice of screen types it is possible to form a sheet of loose fibres consisting of e.g. two outer layers of one type of fibres and a midlayer of another type, the different types of fibres being sorted by means of the chosen types of screens. Tests have shown that the apparatus is usable even for fibres longer than these normally treated by apparatuses of the type considered.

FIG. 6 shown a modified embodiment in which the agitators are mounted for rotation about horizontal axles. The numerals indicating parts in the previous figures indicates equivalent means in FIG. 6. The container 1 is furnished with a modified bottom portion having a screen 15 the cross section of which is U-shaped with a straight bottom portion. Parallel to this there is arranged two horizontal axles 5 on each of which there is mounted a set of rotor members 148 arranged so as to rotate by means of the motor drive 38,40, each of the tips of the members 148 sweeping an area close to the screen 15 at a right angle to this. As indicated with rounded tip ends some of the impellers, designated 51, are shaped slightly like a propeller so as to create a general flow of fibres longitudinally along the curved sides of the screen 15 in one direction along one side and in the opposite direction along the other side. Thus, the impellers serve the combined purpose of whipping the material and moving it around in the container.

A very important feature of the invention, common to both the apparatuses shown in FIGS. 4 and 6, is that the impellers are arranged so as to rotate in a plane non-parallel to the plane of the screens 15,16, the tips being close to these so as to maintain a zone of effectively fluidized fibres directed by means of the centrifugal forces towards the screen portions 15,16 generally in the direction in which the fibres will readily pass the screens. A feature also common for the two examples as the general flow of disintegrated material along the inner side of the screen portions 15,16 so as to facilitate an even output of fibres through the screens 15,16.

The container 1 should preferably, but not necessarily be covered by a lid section (not shown) of screen material permitting an escape of excess air if the fibres are fed through the fishtail inlet 58 by means of transport air exceeding the amount of air being sucked via the exhauster 26, but keeping the fibres within the container.

The amount of fibres in the container 1 is controlled by controlling the rate of input in accordance with the output rate so as to maintain a constant profile of the fibre flow along the screens. However, experiments have surprisingly shown that it is possible to produce a sheet of evenly distributed fibres without maintaining said constant profile; it is in fact possible to feed the fibres botchwise into the container and still obtain even layers of fibres on the netting until the container is run practically empty, which is an outstanding advantage of the invention.

The whip members may be of any suitable design, e.g. constituted by wire members, and they may be arranged for rotation in any suitable manner such that the tip portions thereof are moved repeatedly towards and away from the screen portion cooperating with the whip member.

The slide gate 32 for controlling the suction area may be subdivided into sections as indicated with dotted lines in FIG. 3. The sections may then be individually operated so as to adjust the shape of the suction area 28 and in this way control possible variations of the thickness across the sheet of loose fibres, i.e. if the sheet should be provided with a longitudinal zone in which the layer of fibres is thicker or thinner, the section or sections beneath the zone should be positioned so as to increase or decrease respectively the suction area in question. By [continuos] *continuous* operation during a longer period of time parts of the screen may be clogged up or choked by fibres or foreign matters, whereby a thinner zone of the sheet may be produced. This can be counteracted by means of the individually operable gate sections and may be controlled by automatic means. It will be appreciated that this method of controlling the thickness of a sheet material formed by suction not only is suitable for correcting the uniformity of the cross section of the sheet, but also can be used advantageously as a control means for the thickness of the sheet in general. This thickness control means may further be used in connections other than that of the present invention, i.e. where a submatters of a material is deposited on a forming surface by means of suction.

It should be noted that the slanting screen walls should preferably be provided with the perforations showing free openings as seen in the direction of the centrifugal forces of the rotor members, thus facilitating the penetration of the fibres through the screen. A minor disadvantage of this would be that some fibres were directed directly towards the inner surface of the exterior wall plate 50, so as to build up upon these and give rise to the risk of clumps of articles falling down upon the the sheet of fibres, but this risk is counteracted by means of the scavenging current through the channel 52. Another way of overcoming this problem could be the substituting of the wall plate 50 by a horizontal roller covering with part of its surface the triangular space between the screen 16 and the web. In this way the fibres deposited upon the roller surface can be continuosly removed and the scavenging channel 52 and the sluice 56 may be omitted.

What is claimed is:

1. Apparatus for depositing and distributing loose fibres or particles onto a surface of a moving carrier web comprising:

(a) a housing having inlet and outlet ends;

(b) a moving carrier web having a surface positioned adjacent the outlet end of said housing;

(c) screen means within said housing between said inlet and outlet ends, at least part of said screen means being arranged so as to extend in a manner which is transverse and non-parallel with respect to the surface of the moving carrier web;

(d) agitator means within said housing for creating a flow of said particles or fibres about an axis extending between said inlet and outlet ends, and for directing said particles or fibres outwardly against and through *said part of said* said screen means; and (e) means for directing particles or fibres passing through said screen means to said moving carrier web whereby said particles or fibres are deposited in a layer upon said moving carrier web.

2. Apparatus according to claim 1, wherein said agitator means includes a plurality of agitating members, said agitating members being positioned in spaced areas along the screen means for causing said material to move in a flow, relatively slowly, with respect to the speed of the agitating members, from one area to an adjacent area.

3. An apparatus according to claim 2, in which the housing is elongated crosswise of said moving carrier web and is provided with one row of said agitating members, the part of the screen means which extend transversely and non-parallel with respect to the moving carrier web being located at both sides of said row.

4. Apparatus according to claim 2, characterized in that the whipping is effected by whip members which are rotated in a plane of rotation which intersects said part of the screen means which is transverse and non-parallel to the carrier web.

5. An apparatus according to claim 4, wherein the agitating members are mounted in a stationary row along the screen means and are provided with thin whip elements, the outermost portions of which pass closely along portions of the transversely and non-parallel extending part of said screen means and move in a plane of rotation which is non-parallel to the respective screen portions, all whip members being rotated in a uniform direction of rotation.

6. An apparatus according to claim 5, in which the whip elements project radially from shafts of the agitating members and in which at least some of the whip members of two adjacent agitators are axially offset from each other and mounted so as to rotate in overlapping circular paths.

7. An apparatus according to claim 5, in which the whip elements are constituted by radially projecting rods of flat cross section.

8. An apparatus according to claim 7, in which the rods have opposed surfaces which taper towards each other at least adjacent leading edges of the rods.

9. Apparatus according to claim 1, characterized in that said agitating members are rotary whip members which are rotated in a plane of rotation which intersects said part of the screen means which is transverse and non-parallel to the carrier web.

10. Apparatus according to claim 9, wherein said agitating members have plural whipping elements which whip said fibres or particles, as they rotate about a respective axis, in a manner causing disturbance of the fibres or particles without to any substantial degree causing the material to move with the whipping elements about their respective axis of rotation.

11. An apparatus according to claim 1, wherein said screen means is provided with a bottom having a lower flat portion located above and parallel with the moving carrier web and outer inclined side portions, and wherein the agitator means includes whip members arranged so as to form a correspondingly frusto-conical pattern.

12. An apparatus according to claim 1, in which the housing includes wall portions arranged so as to confine a space between said part of the screen means and the moving carrier web, said space communicating with air intake means for external air.

13. Apparatus according to claim 1, wherein said agitator means comprises a plurality of whip members spaced radially and axially along a rotatable shaft, said whip members being positioned within said container so as to enable all of said whip members to pass in close proximity to said screen.

14. Apparatus according to claim 1, wherein said means for directing comprises a wall member of said housing arranged about said screen means so as to form a space communicating an air intake with said carrier web externally of said screen.

15. Apparatus according to claim 1, wherein said means for directing comprises suction means for drawing the fibre or particle material through said screen means.

16. Apparatus according to claim 15, wherein said moving carrier web is foraminous and said suction means includes a suction box disposed on a side of said moving carrier web which is opposite from the surface adjacent said housing outlet.

17. A method for depositing and distributing loose fibre or particle material onto a surface of a moving carrier web comprising the steps of:

(a) feeding the loose fibre or particle material into a housing having inlet and outlet ends, the outlet end being positioned adjacent a surface of a moving carrier web;

(b) agitating said material within said housing by creating a flow of said material about an axis extending between the inlet and outlet ends of the housing and directing said material outwardly against a screen means which is located in said housing and at least in part extends in a manner which is transverse and non-parallel to said surface of the moving carrier web and through *said part of said* said screen means; and (c) directing material passing through the screen means to said moveable carrier web so that said material is deposited in a layer upon the surface of the moving carrier web.

18. A method according to claim 17, wherein the step of agitating is performed by a plurality of rotary agitating members positioned along spaced areas of the screen means and wherein the material is caused to move in a flow, relatively slowly in comparison to the speed of the agitating members from one area to an adjacent area.

19. A method according to claim 18, wherein the step of agitating is performed by causing a disturbance of the material without to any substantial degree causing the material to move with the rotary agitating members about their respective axis of rotation.

20. A method according to claim 18, wherein the material is directed through the screen means at least in part by suction.

21. A method according to claim 20, wherein the step of directing the fibre of particle material through said screen means by suction is performed by a suction box disposed beneath said carrier web drawing air through said housing, screen means, and carrier web.

*22. Apparatus for distributing and depositing loose fibers or particles onto a surface of a moving carrier web comprising:*

*(a) a foraminous moving carrier web;*

*(b) a distributor housing having an outlet positioned above said carrier web;*

*(c) screen means within said housing for screening a flow of said fibers or particles therethrough prior to their being discharged from said outlet onto said carrier web;*

*(d) flow producing means within said housing, upstream of said screen means, for creating a flow of fibers or particles circulating within said housing and as a whole traveling transversely across said screen means and a line of movement of the moving carrier web and for creating said flow of fibers or particles through said screen means outwardly therefrom; and*

*(e) suction means below said carrier web for drawing said fibers or particles from said outlet onto said carrier web.*

*23. Apparatus according to claim 22, wherein said flow producing means is an agitator means.*

*24. Apparatus according to claim 23, wherein said agitator means comprises at least one shaft mounted for rotation about a substantially horizontal axis and a plurality of impellors extending therefrom, some of said impellors being shaped to create a flow longitudinally relative to said shaft for producing said flow transversely across said screen means.*

*25. Apparatus according to claim 22 or 24, wherein said flow producing means comprises a plurality of agitator means, a first of said agitator means producing said flow transversely across said screen means in a first direction and a second of said agitator means producing said flow transversely across said screen means in an opposite direction, and together said agitator means acting to cause said flow transversely across said screen means to circulate in a path around in said housing.*

*26. Method for distributing and depositing loose fibers or particles comprising the steps of:*

*(a) feeding loose fibers or particles into a distributor housing having an outlet positioned above a foraminous moving carrier web;*

*(b) creating a flow of said particles or fibers circulating within said housing and as a whole traveling transversely across both a screen means positioned for screening a flow of said particles and fibers outwardly therethrough and a line of movement of said carrier web, and applying outwardly directed forces to said transverse flow for creating said flow through said screen means; and*

*(c) drawing said fibers or particles, flowing outwardly through said screen means, onto said carrier web so as to be deposited in a layer thereon.*

*27. Method according to claim 26, wherein said creating steps are performed by agitator means within said housing upstream of said screen means.*

*28. Method according to claim 27, wherein said agitator means is caused to rotate about a substantially horizontal axis.*

*29. Apparatus for distributing and depositing loose fibers or particles onto a surface of a moving carrier web comprising:*

*(a) a foraminous moving carrier web;*

*(b) a distributor housing having an outlet positioned above said carrier web;*

*(c) screen means within said housing for screening a flow of fibers or particles therethrough prior to their being discharged from said outlet onto said carrier web said screen means being elongated in a direction substantially parallel to with the surface of the moving carrier web;*

*(d) flow producing means within said housing, upstream of said screen means, for creating a flow of fibers or particles circulating within said housing and as a whole traveling transversely across said screen means in said direction of elongation substantially parallel to the surface of the moving carrier web and for creating said flow of fibers or particles through said screen means outwardly therefrom; and*

*(e) suction means below said carrier web for drawing said fibers or particles from said outlet onto said carrier web.*

*30. Apparatus according to claim 29, wherein said flow producing means is an agitator means.*

*31. Apparatus according to claim 30, wherein said agitator means comprises at least one shaft mounted for rotation about a substantially horizontal axis and a plurality of impellors extending therefrom, some of said impellors being shaped to create a flow longitudinally relative to said shaft for producing said flow transversely across said screen means in said direction of elongation.*

*32. Apparatus according to claim 31, wherein said shaft extends in said direction of elongation and each of said impellors rotates in a plane that intersects said screen means.*

*33. Apparatus according to claim 29 or 30, wherein said flow producing means comprises a plurality of agitator means, a first of said agitator means producing said flow transversely across said screen means in a fist direction of elongation and a second of said agitator means producing said flow transversely across said screen means in an opposite direction of elongation and together said agitator means acting to cause said flow transversely across said screen means to circulate in a path around in said housing.*

*34. Apparatus according to claim 29, wherein said housing is provided with outer wall portions disposed on an exterior side of portions of said screen means that extend in a generally non-parallel manner with respect to the surface of the moving carrier web, said outer wall and screen means portions defining an air duct having an upper air intake end and a lower end communicating with said housing outlet, whereby both said outward flow of fibers or particles and a scavenging air flow pass through said air duct.*

*35. Method for distributing and depositing loose fibers or particles onto a surface of a moving carrier web comprising the steps of:*

*(a) feeding loose fibers or particles into a distributor housing having an outlet positioned above a foraminous moving carrier web;*

*(b) creating a flow of said particles or fibers circulating within said housing and as a whole traveling across a screen means that is elongated in a direction substantially parallel the surface of the moving carrier web*

*and positioned for screening a flow of said particles and fibers outwardly therethrough in said direction of elongation parallel to the surface of said carrier web, and applying outwardly directed forces to said transverse flow for creating said flow through said screen means; and*

*(c) drawing said fibers or particles, flowing outwardly through said screen means, onto said carrier web so as to be deposited in a layer thereon.*

*36. Method according to claim 35, wherein said creating steps are performed by agitator means within said housing upstream of said screen means.*

*37. Method according to claim 36, wherein said agitator means is caused to rotate about a substantially horizontal axis.*

*38. Method according to claim 37, wherein said agitator means comprises a plurality of rotary shafts each having a plurality of impellors, some of said impellors on each shaft being shaped to create a flow longitudinally of said shaft, said agitator means being operated to cause said flow transversely across the screen means to circulate in a path around in said housing.*

*39. Method according to claim 28, wherein said agitator means comprises a plurality of rotary shafts each having a plurality of impellors, some of said impellors on each shaft being shaped to create a flow longitudinally of said shaft, said agitator means being operated to cause said flow transversely across the screen means to circulate in a path around in said housing.*

*40. An apparatus for distributing loose fibers or particles onto a moved foraminous sheet, comprising:*

*A distributor container located overhead said foraminous sheet and having an inlet for fiber or particle material to be distributed and a perforated outlet wall portion, through which the material is dispensable to a space outside an exterior side of the outlet wall portion,*

*means for creating a flow of air through the foraminous sheet, by suction from beneath the sheet, in an area generally underneath the said space outside of the outlet wall portion to thereby cause the material as dispensed through said outlet wall portion to be carried towards and be deposited on the foraminous sheet,*

*said perforated outlet wall portion being elongate generally in a first direction, which is substantially parallel with the surface of the foraminous sheet;*

*agitator means located inside said distributor container for agitating the material and keeping it air fluidized therein,*

*means for creating a unidirectional, primary flow of the air fluidized material along the interior side of the outlet wall portion substantially in said first direction thereof, from an upstream end to a downstream end of the wall,*

*means for continually guiding said flow of air fluidized material back from said downstream end to said upstream end of the outlet wall portion along a path spaced from said primary flow for recirculation of the material flow,*

*said inlet of the distributor container communicating with the path of said material flow to enable supply of material thereto; and*

*deviator means, forming part of said agitator means, located inside said container operable to impart to the said primary material flow or selected portions thereof a velocity component directed outwardly through said outlet wall, thereby to promote material dispensing through said outlet wall.*

*41. An apparatus according to claim 40, in which said deviator means comprise power driven impeller members located in one or more rows extending along the outlet wall portion in said first direction thereof, each of said impeller members rotating in a plane intersecting the outlet wall portion.*

* * * * *